(12) United States Patent
Zhang et al.

(10) Patent No.: US 11,901,739 B2
(45) Date of Patent: Feb. 13, 2024

(54) BACKUP VOLTAGE AND FREQUENCY SUPPORT METHOD FOR 100%-RENEWABLE ENERGY SENDING-END GRID

(71) Applicant: Zhejiang University, Hangzhou (CN)

(72) Inventors: Zheren Zhang, Hangzhou (CN); Wentao Liu, Hangzhou (CN); Ying Huang, Hangzhou (CN); Yiyan Dong, Hangzhou (CN); Zheng Xu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 18/327,791

(22) Filed: Jun. 1, 2023

(65) Prior Publication Data
US 2023/0307921 A1 Sep. 28, 2023

Related U.S. Application Data (63) Continuation of application No. PCT/CN2023/088704, filed on Apr. 17, 2023.

(51) Int. Cl.
*H02J 3/38* (2006.01)
*G05B 19/042* (2006.01)

(52) U.S. Cl.
CPC ............ *H02J 3/381* (2013.01); *G05B 19/042* (2013.01); *G05B 2219/2639* (2013.01); *H02J 2300/24* (2020.01); *H02J 2300/28* (2020.01)

(58) Field of Classification Search
CPC .... H02J 3/381; H02J 2300/24; H02J 2300/28; G05B 19/042; G05B 2219/2639
See application file for complete search history.

(56) References Cited

U.S. PATENT DOCUMENTS

| | | | |
|---|---|---|---|
| 6,681,361 B1* | 1/2004 | Nakano | G01R 31/2893 324/759.03 |
| 7,030,596 B1* | 4/2006 | Salerno | H02M 3/158 323/282 |
| 2004/0084965 A1* | 5/2004 | Welches | H02J 3/30 307/64 |

(Continued)

FOREIGN PATENT DOCUMENTS

| CN | 106786724 A | 5/2017 |
|---|---|---|
| CN | 108521139 A | 9/2018 |

(Continued)

OTHER PUBLICATIONS

Zheng Xu et al., "Research on Application of LCC-MMC Series Hybrid HVDC Topology for Large Scale Clean Energy Base Integration", Power Capacitor & Reactive Power Compensation, vol. 43, No. 3, Jun. 2022, pp. 119-126.

(Continued)

*Primary Examiner* — Ziaul Karim (57) ABSTRACT

A backup voltage and frequency support method for a 100%-renewable energy sending-end grid, including: (S1) selecting a plurality of support nodes in the 100%-renewable energy sending-end grid; (S2) mounting a backup voltage and frequency support device at each support node; and (S3) dynamically adjusting an active power output of a renewable energy station of the 100%-renewable energy sending-end grid according to a frequency of a grid-connection point.

6 Claims, 12 Drawing Sheets

(56) References Cited

U.S. PATENT DOCUMENTS

2008/0148091 A1* 6/2008 Takeuchi .............. G06F 1/3296
  713/600
2021/0320496 A1* 10/2021 Brombach .............. H02J 3/381

FOREIGN PATENT DOCUMENTS

| | | |
|---|---|---|
| CN | 109787265 A | 5/2019 |
| CN | 115102421 A | 9/2022 |
| CN | 115333135 A | 11/2022 |
| JP | 2019004571 A | 1/2019 |
| WO | 2022188471 A1 | 9/2022 |

OTHER PUBLICATIONS

Theodore Soong et al., "Evaluation of Emerging Modular Multi-level Converters for BESS Applications", IEEE Transactions on Power Delivery, vol. 29, No. 5, Oct. 2014, pp. 2086-2094.

* cited by examiner

BACKUP VOLTAGE AND FREQUENCY SUPPORT METHOD FOR 100%-RENEWABLE ENERGY SENDING-END GRID

CROSS-REFERENCE TO RELATED APPLICATIONS

This application is a continuation of International Patent Application No. PCT/CN2023/088704, filed on Apr. 17, 2023, which claims the benefit of priority from Chinese Patent Application No. 202211512512.7, filed on Nov. 28, 2022. The content of the aforementioned application, including any intervening amendments thereto, is incorporated herein by reference in its entirety.

TECHNICAL FIELD

The present application relates to power transmission and distribution, and more particularly to a backup voltage and frequency support method for a 100%-renewable energy sending-end grid.

BACKGROUND

In China, the coal resources are mainly in the central and western areas, and the renewable energy resources are mainly in the northeast, northern, northwest and southwest, whereas, the energy loads are mainly in the eastern coastal area. According to the '30.60' decarbonization goal, China will vigorously develop large-scale onshore renewable energy bases in the northern and western areas, and these renewable energy bases will generally adopt ultra-high voltage direct current (UHVDC) transmission technology. In addition, the construction of offshore wind power bases will be developed to accelerate the development of offshore wind power cluster, which will focused on building five 10 million-kilowatt offshore wind power bases in Shandong Peninsula, the Yangtze River Delta region, South Fujian, East Guangdong and Beibu Bay.

Large-scale onshore renewable energy power generation bases built in desert, Gobi and wilderness are costly to interconnect, the construction of local conventional power sources is difficult, and there is inherently no alternating current (AC) power grid in the large-scale offshore wind power bases. Therefore, the sending-end grid includes a 100%-renewable energy base and an ultra-high voltage (UHV) flexible direct current (DC) system configured to transmit power, such that the renewable energy source can be operated in a conventional grid-following control mode. The voltage source converter-based high-voltage DC (VSC-HVDC) station adopts V/F control to provide stable voltage and frequency reference for the 100%-renewable energy sending-end grid.

The 100%-renewable energy sending-end grid is fundamentally different from the conventional AC grid in terms of the voltage and frequency support. Regarding the conventional AC grid, voltage and frequency of the entire grid are supported by the synchronous machine power supply distributed in the grid, and the voltage and frequency support is built by synchronous machines from the bottom to top. Therefore, when a single synchronous machine is out of operation, the AC grid can still operate. Whereas, for the 100%-renewable energy sending-end grid, if only the VSC-HVDC station at the transmission end adopts grid-following control, voltage and frequency of the entire 100%-renewable energy sending-end grid are merely supported by the VSC-HVDC station, and the voltage and frequency support is built by the VSC-HVDC station from the top to bottom. Therefore, when the DC system is faulty and leads to bipolar blocking of the VSC-HVDC station at the sending end, the 100%-renewable energy sending-end grid will lose the voltage and frequency support, thus fails to operate.

In terms of energy balance, the conventional AC grid includes a large number of rotating devices, and a transient energy can be balanced by theses rotating equipment. Unfortunately, there is not synchronous machine in the 100%-renewable energy sending-end grid, such that the transient energy is merely balanced by the VSC-HVDC station. Once the bipolar blocking occurs in the VSC-HVDC station at the transmission end, the transient energy will lead to a significant increase in power in the sending-end grid, which will seriously affect the safety of electrical equipment in the sending-end grid.

According to the operation experience, the occurrence probability of bipolar blocking in UHVDC is about 1 per year, and the temporary fault is the most. Accordingly, the 100%-renewable energy sending-end grid needs the function of backup voltage and frequency support. When the DC transmission system is in bipolar blocking due to temporary fault, the backup voltage and frequency support can be used to prevent 100%-renewable energy sending-end grid from shutdown.

At present, most published documents do not consider the bipolar blocking of the VSC-HVDC station at the 100%-renewable energy sending-end grid, and it is urgent to provide a method for backup voltage and frequency support of the 100%-renewable energy sending-end grid.

SUMMARY

Accordingly, this disclosure provides a backup voltage and frequency support method for a 100%-renewable energy sending-end grid, which has simple operation and strong universality, and can improve the operation stability of the 100%-renewable energy sending-end grid, exhibiting a promising prospect in the practical engineering.

The technical solutions of this application are described as follows.

This application provides a backup voltage and frequency support method for a 100%-renewable energy sending-end grid, comprising:

(S1) selecting a plurality of support nodes in the 100%-renewable energy sending-end grid;

(S2) mounting a backup voltage and frequency support device at each of the plurality of support nodes; and (S3) dynamically adjusting an active power output of a renewable energy station of the 100%-renewable energy sending-end grid according to a frequency of a grid-connection point.

In some embodiments, the number of the renewable energy station is two or more; two or more renewable energy stations each independently are a photovoltaic power station, an onshore wind power station or an offshore wind power station; the two or more renewable energy stations are integrated into an alternating-current (AC) system, and are connected to a sending-end rectifier station after several times of voltage boosting.

In some embodiments, all nodes (that is, AC bus) in the 100%-renewable energy sending-end grid are grouped according to voltage level (such as 35 kV, 110 kV, 220 kV and 500 kV); and all nodes except a node O from a node group with a highest voltage level are selected as the plurality of support nodes, wherein the node O is a node in the 100%-renewable energy sending-end grid directly connected to the sending-end rectifier station.

In some embodiments, the backup voltage and frequency support device is an energy-storage modular multilevel converter (MMC); the energy-storage MMC comprises an energy storage device; the energy storage device is centralizedly arranged at a direct-current (DC) side of the energy-storage MMC or decentralizedly arranged in a sub-module of the energy-storage MMC through an interface circuit; and the energy storage device is formed by a plurality of energy storage elements connected in series or parallel, wherein the plurality of energy storage elements are batteries or supercapacitors.

In some embodiments, the backup voltage and frequency support device adopts a power-synchronization control strategy; an active power control part of the power synchronization control strategy is configured to calculate a difference between an active power instruction value and an active power actual value, and output a frequency compensation through a first-order lag element, wherein the active power instruction value is set to zero, and the difference is taken as an input of the first-order lag element; and a reactive power control part of the power-synchronization control strategy is configured to calculate a difference between an AC voltage instruction value and an AC voltage actual value, and output a current instruction value through a proportional integral (PI) control, wherein the AC voltage instruction value is set to 1.0 per unit (p.u.).

In some embodiments, a transfer function of the first-order lag element is represented by:

$$\frac{1}{2Hs+D};$$

wherein D is a damping coefficient; H is an inertia time constant; and s is a Laplace operator; and a gain factor 1/D is set to 0.005-0.02 p.u.

In some embodiments, in step (S3), in step (S3), an instruction value of an adjusted active power output is obtained by multiplying an instruction value of an original active power output by a proportional coefficient k.

In some embodiments, the proportional coefficient k is determined by the frequency of the grid-connection point of the renewable energy station; if the frequency of the grid-connection point is equal to or less than a first preset frequency threshold $f_{th1}$, k=1; if the frequency of the grid-connection point is equal to or larger than a second preset frequency threshold $f_{th2}$, k=0; and if the frequency of the grid-connection point is larger than the first preset frequency threshold $f_{th1}$ and less than the second preset frequency threshold $f_{th2}$, k decreases linearly with an increase of the frequency of the grid-connection point.

In some embodiments, the first preset frequency threshold $f_{th1}$ is 1.004 p.u.; and the second preset frequency threshold $f_{th2}$ is 1.01 p.u.

Compared to the prior art, the disclosure has the following beneficial effects.

1. The backup voltage and frequency support method provided herein provides a control strategy of the 100%-renewable energy station in the case of bipolar blocking of a sending-end VSC-HVDC converter station, and can offer some references for the engineering design.

2. The backup voltage and frequency support method can prevent the unnecessary outage of the 100%-renewable energy sending-end grid, and enhancing the system operation stability and reliability, exhibiting a promising prospect in the practical engineering.

DETAILED DESCRIPTION OF EMBODIMENTS

The disclosure will be described in detail below with reference to the embodiments and accompanying drawings to enable those skilled in the art to implement the technical solutions of the disclosure.

Figure 1:
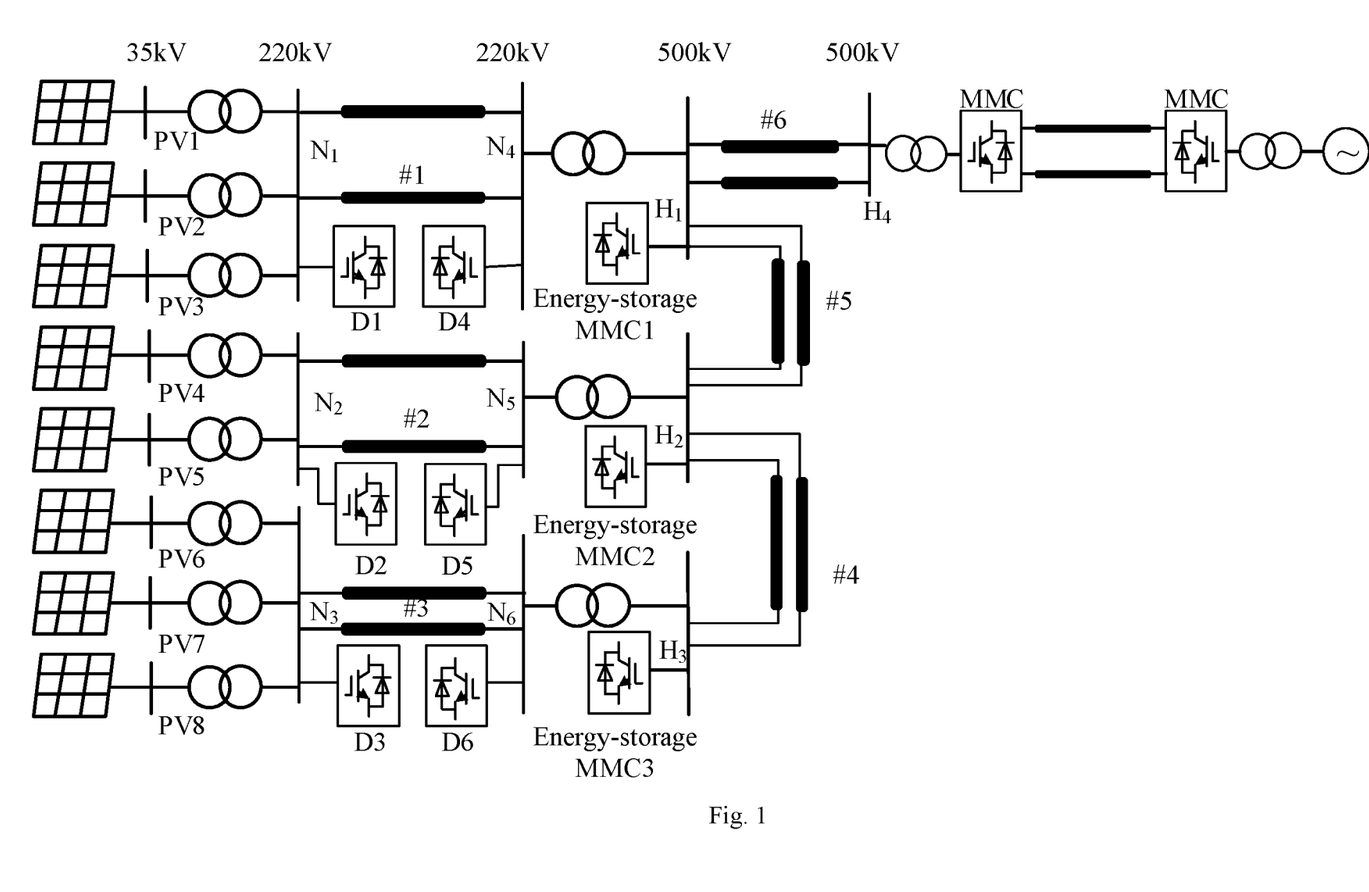
FIG. 1 structurally shows a 100%-renewable energy sending-end grid with a VSC-HVDC transmission system according to an embodiment of the present disclosure.

Referring to FIG. 1, a 100%-renewable energy sending-end grid is divided into eight regions according to geographic position. Each region is equivalent to an aggregated photovoltaic power station, and is connected to a 35 kV AC bus. A rated power of the aggregated photovoltaic power station is equal to a sum of rated powers of all the photovoltaic power stations in the region. In this embodiment, the rated power of each aggregated photovoltaic power station is 500 MW. The eight aggregated photovoltaic power stations (marked as PV1-PV8) undergo boosting, and then are connected to three 220 kV AC buses (PV1-PV3 are connected to a first 220 kV AC bus $N_1$; PV4-PV5 are connected to a second 220 kV AC bus $N_2$; and PV6-PV8 are connected to a third 220 kV AC bus $N_3$), transmitted by about 10 km of a double-circuit AC line to three 220 kV transformer substations for boosting to 500 kV. All 500 kV buses (marked as $H_1$-$H_3$) are connected to a 500 kV VSC-HVDC station through about 50 km of a double-circuit AC line, respectively. Each 220 kV AC bus is provided with a dynamic reactive power compensation device, that is, static synchronous compensator (STATCOM), marked as $D_1$-$D_6$.

A backup voltage and frequency support method for the above-mentioned 100%-renewable energy sending-end grid includes the following steps.

(S1) All 500 kV buses except a 500 kV bus directly connected to the voltage source converter-based high-voltage DC (VSC-HVDC) station are selected from the 100%-renewable energy sending-end grid as support nodes.

Figure 2A:
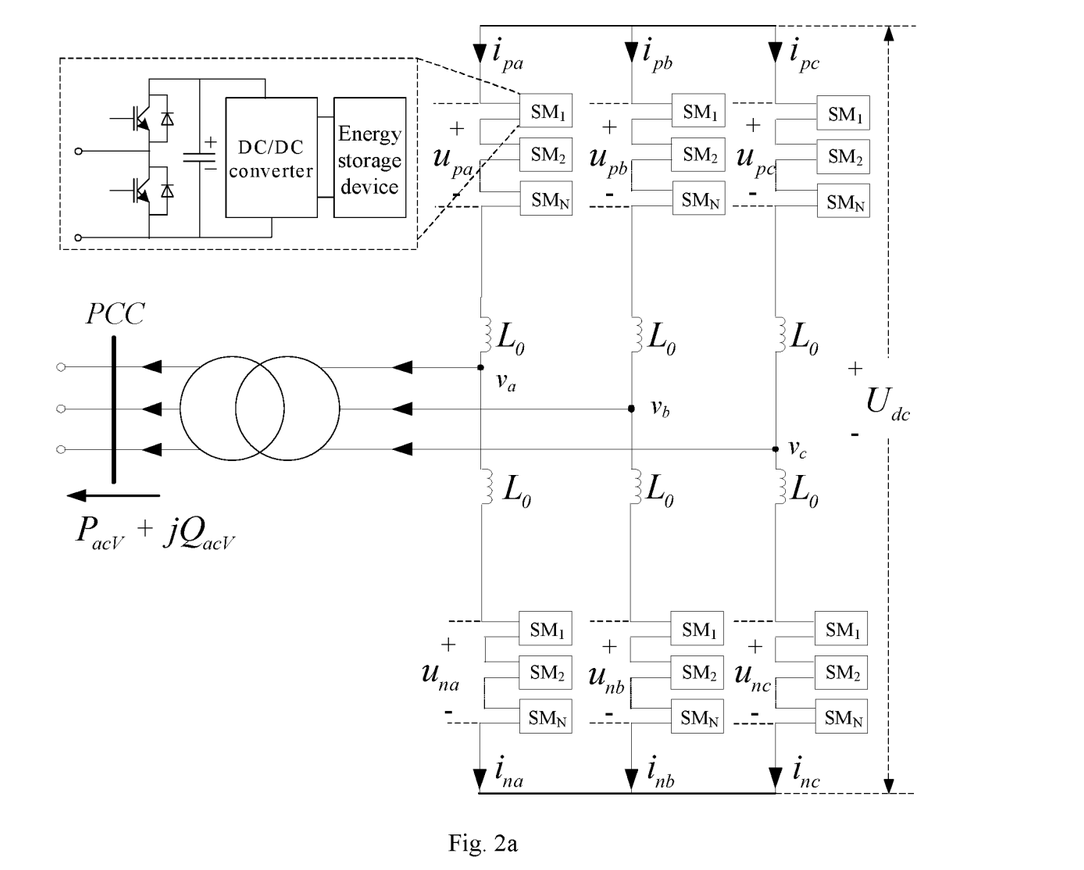
FIG. 2a structurally illustrates an energy-storage MMC according to an embodiment of the present disclosure, in which an energy storage device is integrated in a sub-module.
Figure 2B:
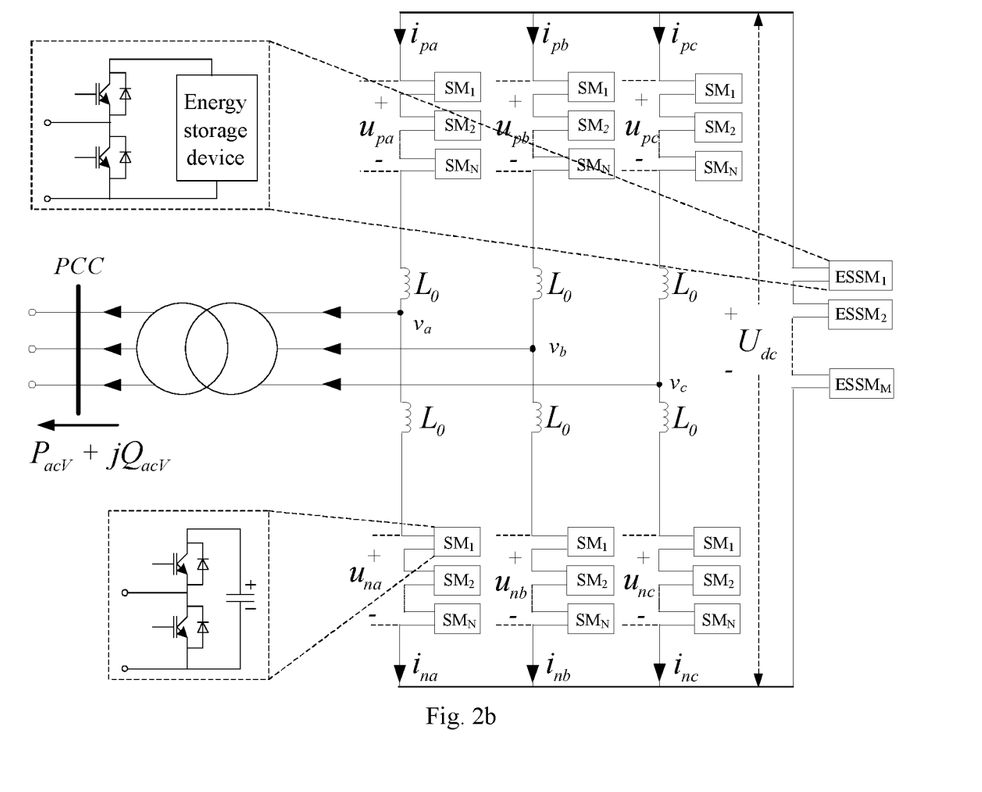
FIG. 2b structurally illustrates an energy-storage MMC according to an embodiment of the present disclosure, in which an energy storage device is centralizedly arranged at a DC side.

(S2) An energy-storage MMC is mounted at individual support nodes as a backup voltage and frequency support device. The energy-storage MMC includes six bridge arms, and each bridge arm includes N cascading sub-modules and one bridge arm reactor $L_0$, see the literature "Soong T, Lehn P W. *Evaluation of Emerging Modular Multilevel Converters for BESS Applications*[J]. *IEEE Transactions on Power Delivery*, 2014, 29(5):2086-2094". FIG. 2a shows an energy-storage MMC, in which the energy storage device is integrated in a sub-module. All sub-modules of the energy-storage MMC are energy storage sub-modules, each consisting of a half-bridge sub-module and an energy storage device. The energy storage device is connected in parallel with a sub-module capacitor through a bidirectional DC/DC converter. In an embodiment, the energy storage device in an energy-storage MMC is centralizedly arranged at a DC side, as shown in FIG. 2b. All sub-modules of the energy-storage MMC are half-bridge sub-module, and cascading sub-modules are centralizedly arranged at the DC side.

Figure 3A:
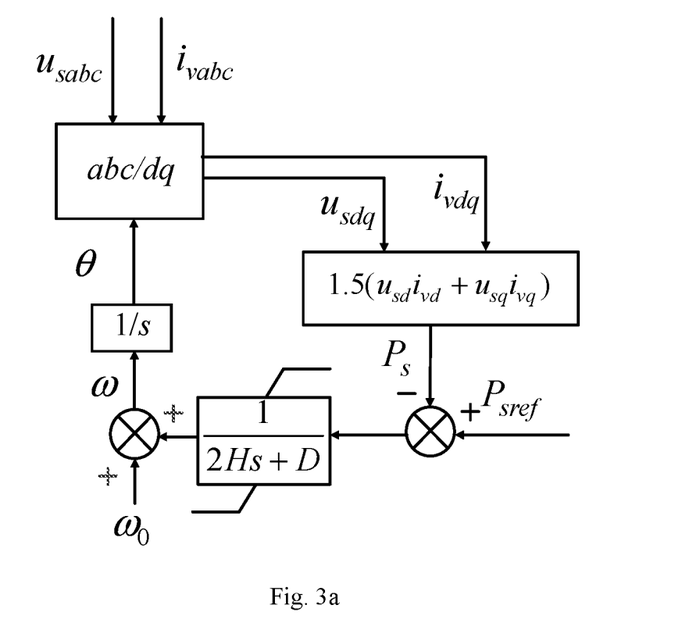
FIG. 3a schematically shows a structure of a power synchronization loop of power synchronization control.

All energy-storage MMCs adopt a power-synchronization control. An active power controller of the power-synchronization control is a power synchronization loop (PSL), as shown in FIG. 3a. A difference between an active power instruction value $P_{sref}$ and an active power actual value $P_s$ is calculated, and then a frequency signal $\Delta\omega$ is output through a first-order lag element represented by:

$$\frac{1}{2Hs+D}.$$

where D is a damping coefficient; H is an inertia time constant; s is a Laplace operator; and $P_{sref}$ is zero.

Figure 3B:
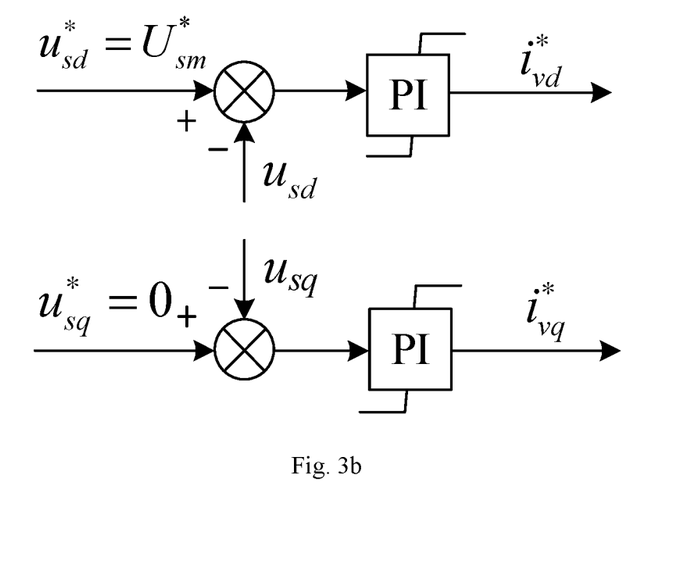
FIG. 3b schematically shows a structure of a constant AC voltage loop of the power synchronization control.

A reactive power controller is shown in FIG. 3b. $u^*_{sd}$ represents a d-axis component of AC bus voltage instruction value, $u^*_{sq}$ represents a q-axis component of AC bus voltage instruction value. $u^*_{sd}$ and $u^*_{sq}$ respectively undergo making difference with actual value to obtain a current instruction value at d-axis component and a current instruction value at q-axis component through a PI controller. $u^*_{sd}$ is set to the AC bus voltage instruction value $U^*_{sm}$, which is set to 1. $u^*_{sq}$ is set to 0.

Figure 4:
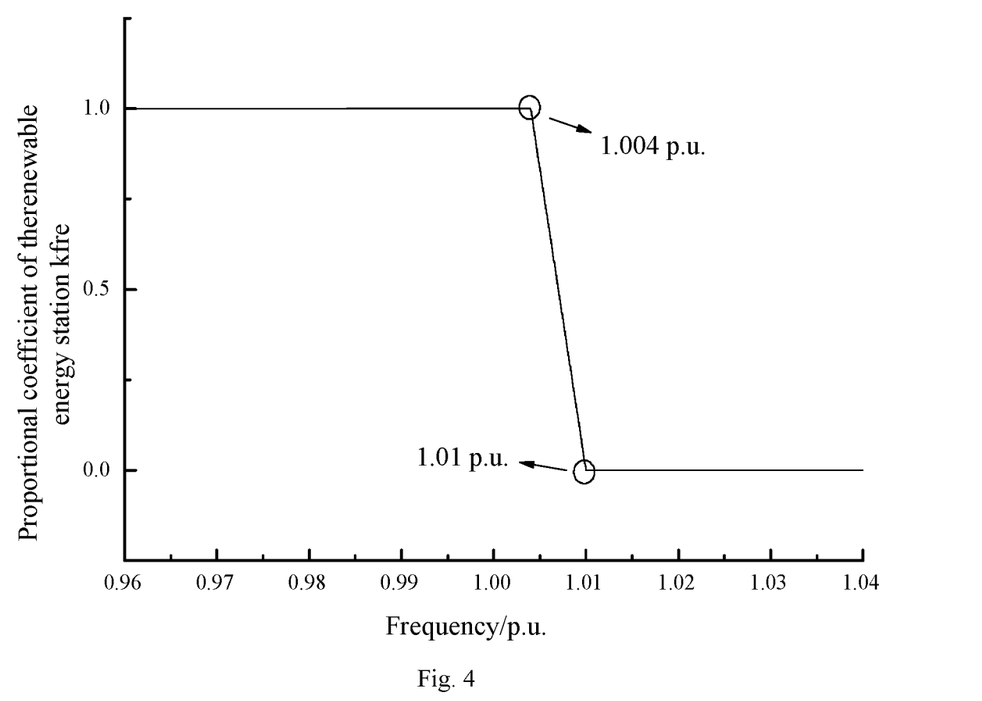
FIG. 4 shows a characteristic curve of a proportional coefficient k versus a frequency of a grid-connection point.

(S3) Active power instruction values of the aggregated photovoltaic power stations are dynamically adjusted according to a frequency of a grid-connection point. An active power output instruction value $P^*_{ac}$ of the aggregated photovoltaic power station is obtained by multiplying an active power output instruction value $P^*_{ac0}$ of the aggregated photovoltaic power station without considering a frequency regulation characteristic by a proportional coefficient $k_{fre}$. As shown in FIG. 4, if the frequency of the grid-connection point is less than 1.004 p.u., $k_{fre}$ 1.0. If the frequency of the grid-connection point is larger than 1.01 p.u., $k_{fre}$ 0. If the frequency of the grid-connection point is larger than 1.004 p.u. and less than 1.01 p.u., $k_{fre}$ decreases linearly from 1.0 to 0.

Parameters in this embodiment are shown in Table 1.

TABLE 1

| System parameters | |
|---|---|
| Aggregated photovoltaic power station | |
| Item | Value |
| Rated power | 500 MW |
| 220 kV AC line | |
| Item | Value |
| Rated power | 230 kV |
| Length | 10 km(#1), 11 km(#2), 10 km(#3) |
| The number of parallel circuits | 2 |
| 500 kV AC line | |
| Item | Value |
| Rated power | 525 kV |
| Length | 45 km(#4), 50 km(#5), 55 km(#6) |
| The number of parallel circuits | 2 |
| energy-storage MMC | |
| Capacity/MW | 2000(#1), 1500 (#2), 1500 (#3) |
| Inertia time constant H | 5(#1), 5(#2), 5(#3) |
| Damping coefficient D | 123(#1), 120(#2), 110(#3) |
| Sending-end VSC-HVDC station | |
| Item | Value |
| Control method | Constant V/F control |
| Rated capacity of sending-end VSC-HVDC station | 5000 MVA |
| Capacity of converter transformer | 6000 MVA |
| Transformer ratio of converter transformer | 525 kV/500 kV |
| Leakage reactance of converter transform | 0.1 p.u. |
| Rated DC voltage | 500 kV |
| Receiving-end VSC-HVDC station | |
| Item | Value |
| Control method | Constant DC voltage, Constant reactive power |
| Rated capacity of receiving-end VSC-HVDC station | 5000 MVA |
| Capacity of converter transformer | 6000 MVA |
| Transformer ratio of converter transformer | 525 kV/500 kV |
| Leakage reactance of converter transformer | 0.1 p.u. |
| Rated DC voltage | 500 kV |

A transient simulation model of the 100%-renewable energy sending-end grid as shown in FIG. 1 is built by the electromechanical transient simulation software PSS/E, and an effect of the backup voltage and frequency support method is tested. Before t=2.0 s, all aggregated photovoltaic power stations operate at full power under a light intensity of 1000 W/m², and active powers output by the three energy-storage MMC are 0. If the sending-end VSC-HVDC station exits the operation due to fault at t=2.0 s, and when t=3.5 s, the sending-end VSC-HVDC station starts the operation again.

Figure 5:
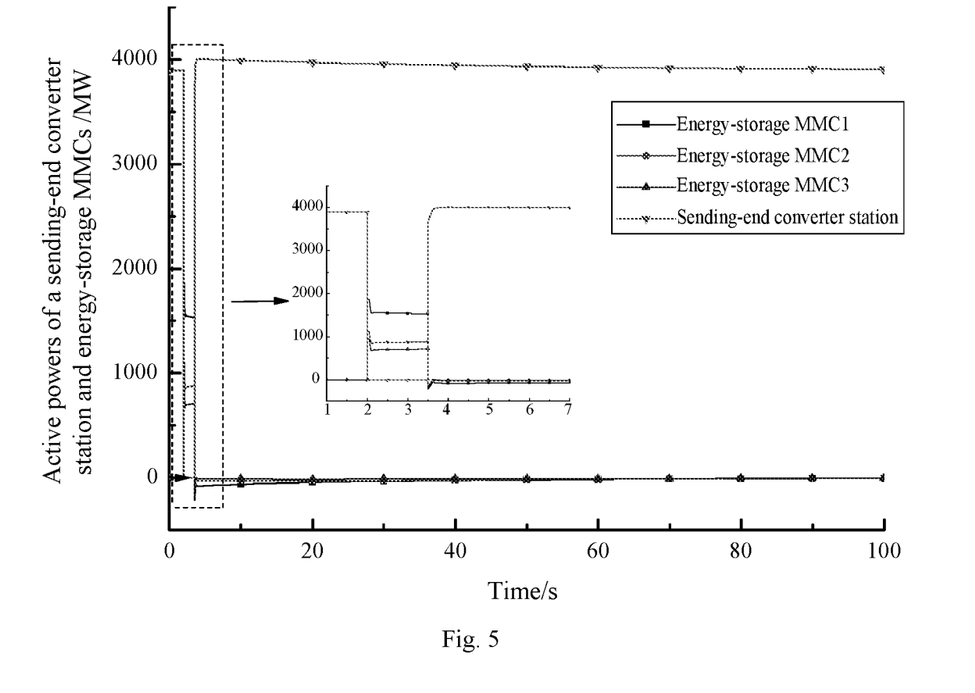
FIG. 5 schematically shows a simulation waveform of active powers of sending-end VSC-HVDC station and energy-storage MMCs according to an embodiment of the present disclosure.
Figure 6:
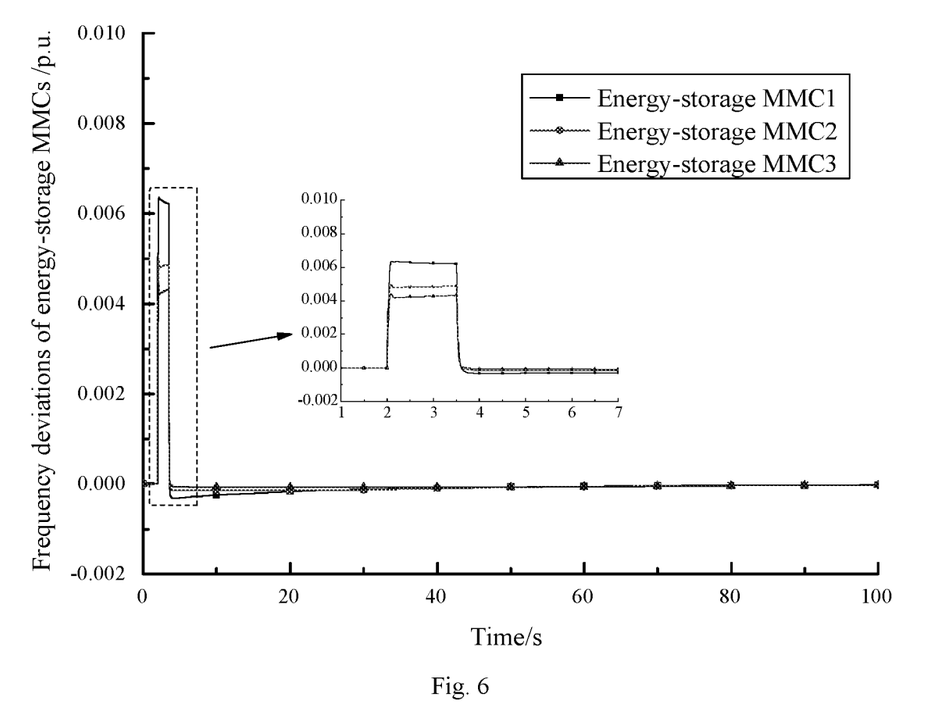
FIG. 6 schematically shows a simulation waveform of frequency deviation of energy-storage MMCs according to an embodiment of the present disclosure.
Figure 7:
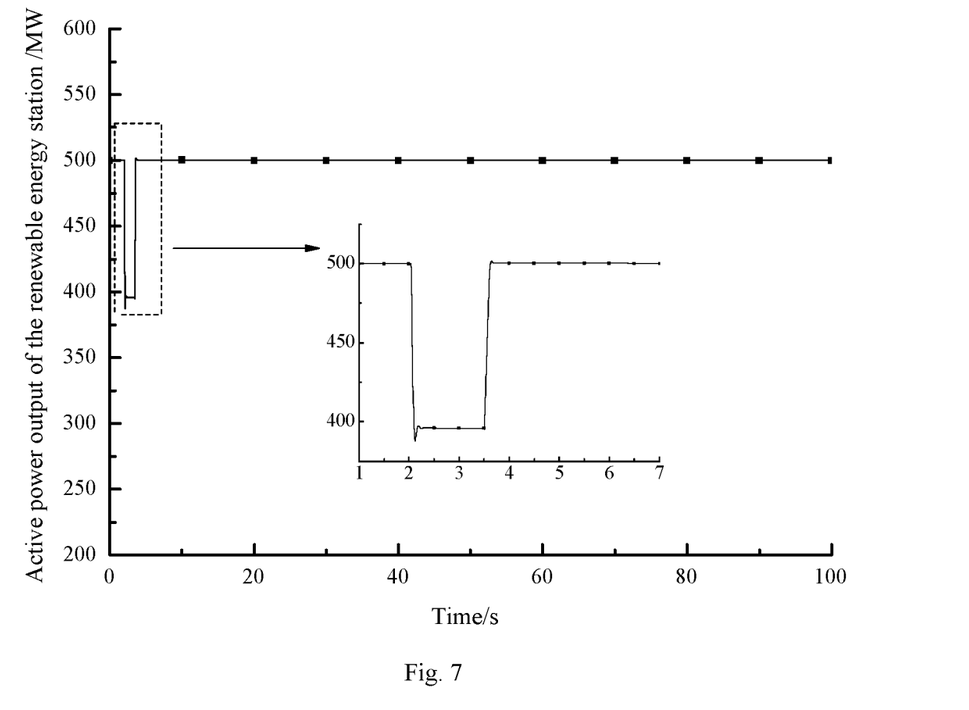
FIG. 7 schematically shows a simulation waveform of active power output by a renewable energy station according to an embodiment of the present disclosure.
Figure 8A:
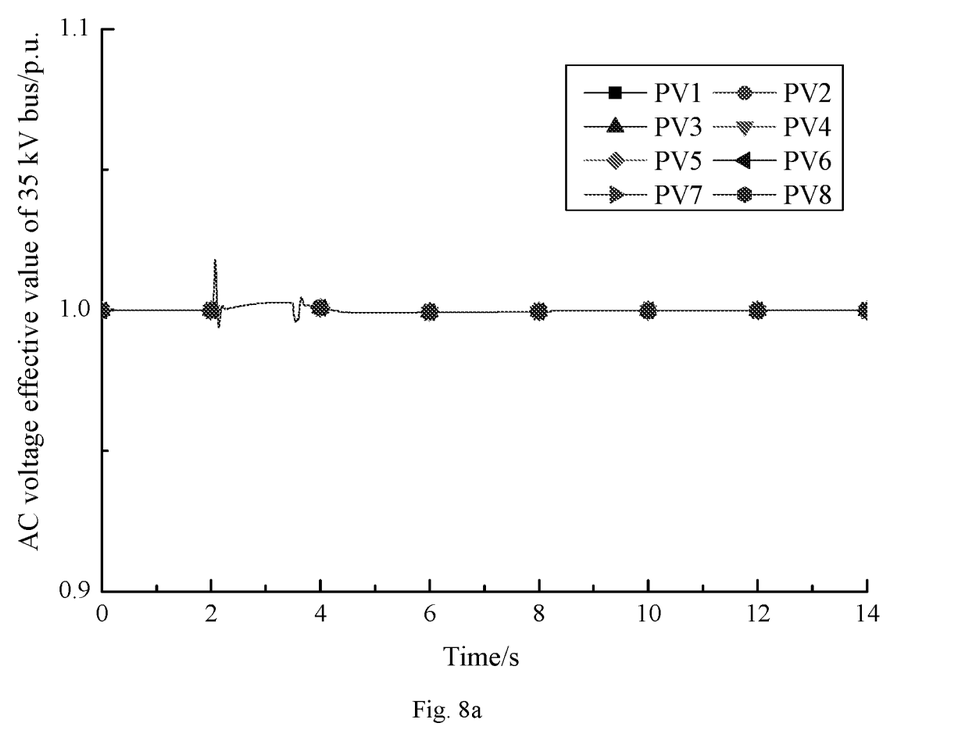
FIG. 8a schematically shows a simulation waveform of an effective value of AC voltage of a 35 kV bus according to an embodiment of the present disclosure.
Figure 8B:
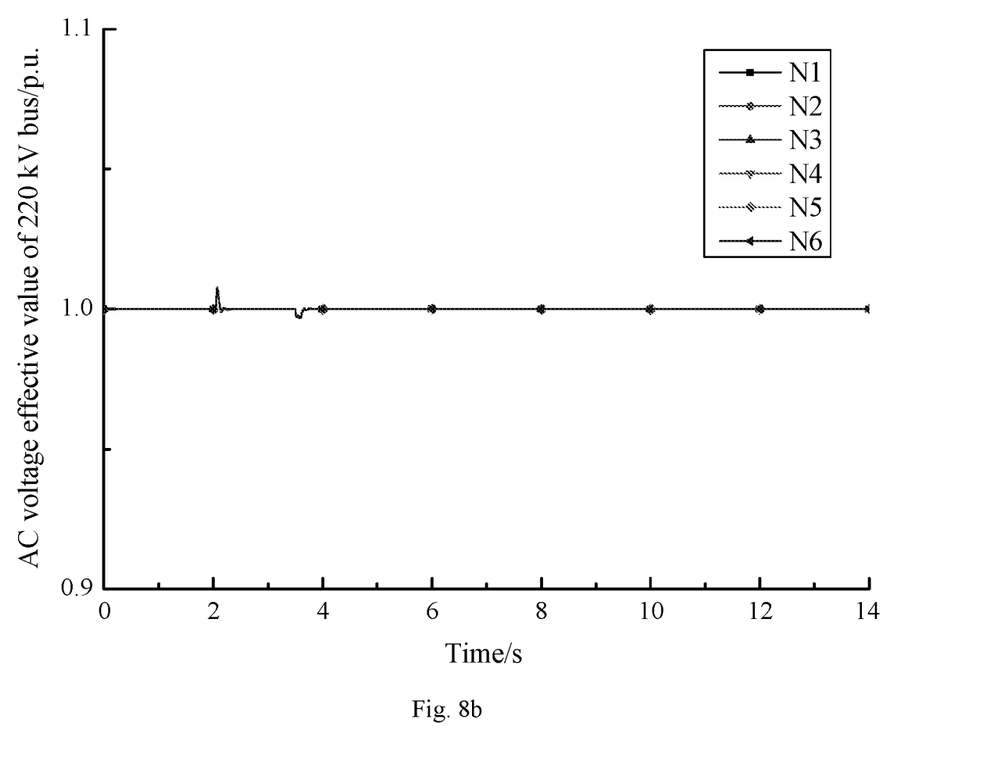
FIG. 8b schematically shows a simulation waveform of an effective value of AC voltage of a 220 kV bus according to an embodiment of the present disclosure.
Figure 8C:
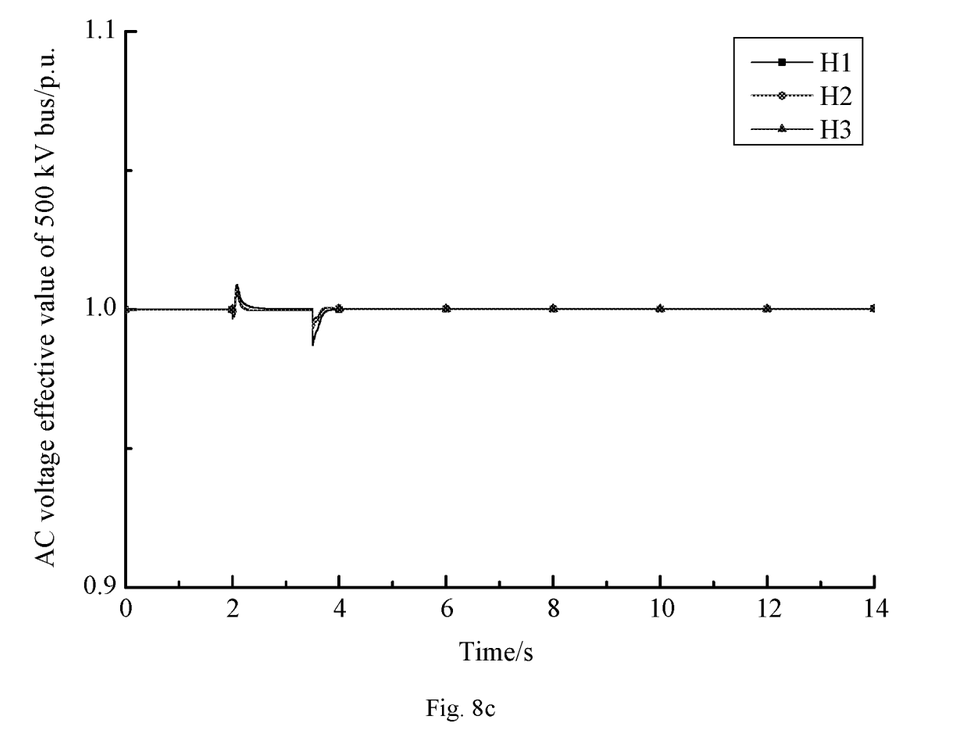
FIG. 8c schematically shows a simulation waveform of an effective value of AC voltage of a 500 kV bus according to an embodiment of the present disclosure.

Referring to FIG. 5, when the sending-end VSC-HVDC station stops suddenly, the energy-storage MMC mounted at the support node can absorb the active power generated by the renewable energy station, so as to maintain the power balance of the sending-end system. Referring to FIG. 6, in a transient process in which the sending-end VSC-HVDC station stops suddenly and the active power is transmitted to the energy-storage MMC, the frequency deviation of each energy-storage MMC is not larger than 0.0065 p.u. After the sending-end VSC-HVDC station operates again, the frequency deviation will gradually disappear, and a frequency of the system returns to the steady-state balance point. Referring to FIG. 7, in the transient process, the active power output of each renewable energy station can reduce with an increase of a frequency of the grid-connection point, so as to assist fault crossing. Referring to FIGS. 8a-8c, during the whole transient process, a transient voltage of each AC bus of the system can be controlled at 0.98-1.1 p.u., and no serious AC overvoltage will occur in the system.

In summary, when the sending-end VSC-HVDC station stops suddenly, the backup voltage and frequency support method provided herein play an obvious role in maintaining the voltage and frequency of the sending-end system, such that a frequency fluctuation and voltage fluctuation of the sending-end system will be in a small range, that is, the backup voltage and frequency support method is effective.

The embodiments provided herein are merely illustrative, and are not intended to limit the scope of the present disclosure. Any modifications and improvements made by those skilled in the art based on the content disclosed herein without paying any creative effort shall fall within the scope of the present disclosure defined by the appended claims.

What is claimed is:

1. A backup voltage and frequency support method for a 100%-renewable energy sending-end grid, comprising: (Si) selecting a plurality of support nodes in the 100%-renewable energy sending-end grid; (S2) mounting a backup voltage and frequency support device at each of the plurality of support nodes; and (S3) dynamically adjusting an active power output of a renewable energy station of the 100%-renewable energy sending-end grid according to a frequency of a grid-connection point; wherein in step (Si), all nodes in the 100%-renewable energy sending-end grid are grouped according to voltage level; wherein voltage level includes 35 KV, 110 KV, 220 KV and 500 KV; wherein in step (S2),the backup voltage and frequency support device is an energy-storage modular multilevel converter (MMC); the energy-storage MMC comprises an energy storage device; the energy storage device is centralizedly arranged at a direct-current (DC) side of the energy-storage MMC or decentralizedly arranged in a sub-module of the energy-storage MMC through an interface circuit; and the energy storage device is formed by a plurality of energy storage elements connected in series or parallel, wherein the plurality of energy storage elements are batteries or supercapacitors; and the backup voltage and frequency support device adopts a power-synchronization control strategy; an active power control part of the power-synchronization control strategy is configured to calculate a difference between an active power instruction value and an active power actual value, and output a frequency compensation through a first-order lag element, wherein the active power instruction value is set to zero, and the difference is taken as an input of the first-order lag element; and a reactive power control part of the power-synchronization control strategy is configured to calculate a difference between an AC voltage setting value and an AC voltage actual value, and output a current instruction value through a proportional integral (PI) control, wherein the AC voltage setting value is set to 1.0 per unit (p.u.).

2. The backup voltage and frequency support method of claim 1, wherein the number of the renewable energy station is two or more; two or more renewable energy stations each independently are a photovoltaic power station, an onshore wind power station or an offshore wind power station; the two or more renewable energy stations are integrated into an alternating-current (AC) system, and connected to the sending-end rectifier station after several times of voltage boosting.

3. The backup voltage and frequency support method of claim 1, wherein a transfer function of the first-order lag element is represented by:

$$\frac{1}{2Hs+D};$$

wherein D is a damping coefficient; H is an inertia time constant; and s is a Laplace operator; and a gain factor 1/D is set to 0.005-0.02 p.u.

4. The backup voltage and frequency support method of claim 1, wherein in step (S3), an instruction value of an adjusted active power output is obtained by multiplying an instruction value of an original active power output by a proportional coefficient k.

5. The backup voltage and frequency support method of claim 4, wherein the proportional coefficient k is determined by the frequency of the grid-connection point of the renewable energy station; if the frequency of the grid-connection point is equal to or less than a first preset frequency threshold $f_{th1}$, k=1; if the frequency of the grid-connection point is equal to or larger than a second preset frequency threshold $f_{th2}$, k=0; and if the frequency of the grid-connection point is larger than the first preset frequency threshold fail and less than the second preset frequency threshold $f_{th2}$, k decreases linearly with an increase of the frequency of the grid-connection point.

6. The backup voltage and frequency support method of claim 5, wherein the first preset frequency threshold $f_{th1}$ is 1.004 p.u.; and the second preset frequency threshold $f_{th2}$ is 1.01 p.u.

* * * * *